United States Patent [19]

Zimmer

[11] 4,451,307
[45] May 29, 1984

[54] METHOD OF APPLYING COLOR RELIEF DECORATIONS TO CERAMIC AND LIKE PRODUCTS

[75] Inventor: Kurt Zimmer, Losheim-Britten, Fed. Rep. of Germany

[73] Assignee: Villeroy & Boch Keramische Werke KG, Mettlach, Fed. Rep. of Germany

[21] Appl. No.: 529,658

[22] Filed: Sep. 6, 1983

Related U.S. Application Data

[63] Continuation of Ser. No. 279,582, Jul. 1, 1981, abandoned.

[30] Foreign Application Priority Data

Jul. 4, 1980 [DE] Fed. Rep. of Germany ....... 3025364

[51] Int. Cl.³ ............... C03B 29/00; B29C 17/00; C04B 33/34; C04B 35/64
[52] U.S. Cl. .................................. 156/63; 156/89; 156/198; 156/240; 156/309.6; 264/56; 428/542.8
[58] Field of Search ............ 156/59, 63, 82, 89, 156/81, 155, 198, 209, 212, 214, 220, 223, 231, 230, 240, 246, 249, 273.7, 285, 289, 309.6, 308.8, 290; 264/56, 65, 66; 428/352, 542.8, 914

[56] References Cited

U.S. PATENT DOCUMENTS

| | | | |
|---|---|---|---|
| 3,445,309 | 5/1969 | Milliken | 156/240 |
| 3,940,523 | 2/1976 | Lecoeur et al. | 156/63 |
| 4,075,049 | 2/1978 | Wood | 156/240 |
| 4,263,734 | 4/1981 | Bradshaw | 156/89 |

FOREIGN PATENT DOCUMENTS 1253134 10/1967 Fed. Rep. of Germany.
1801321 10/1972 Fed. Rep. of Germany.
2326191 3/1978 Fed. Rep. of Germany.

Primary Examiner—Edward C. Kimlin
Assistant Examiner—Louis Falasco
Attorney, Agent, or Firm—Peter K. Kontler

[57] ABSTRACT

A color decal is applied to the flat side of a relief image consisting of ceramic or like material in such a way that the color fields are adjacent to the flat side and are overlapped by a lacquer mask which contains frit and is separated from a paper carrier by a water-soluble film of glue or albumen. In order to apply the combined color and relief image to the surface of a ceramic or like object, the uneven side of the relief image is pressed against the surface of the object prior or subsequent to melting of the film so as to detach the carrier and expose the mask. In the next step, the images are treated by a squeegee or an analogous tool so as to partially deform the originally flat side of the relief image prior to sintering which entails evaporation of lacquer and conversion of frit into a glaze overlying the color fields which, in turn, overlie the uneven side of the relief image. The unevennesses of the side which contacts the surface of the object are completely transferred to the originally flat side in the course of the sintering operation.

9 Claims, 3 Drawing Figures

METHOD OF APPLYING COLOR RELIEF DECORATIONS TO CERAMIC AND LIKE PRODUCTS

This application is a continuation of application Ser. No. 279,582, filed July 1, 1981, now abandoned.

BACKGROUND OF THE INVENTION

The present invention relates to a method of decorating ceramic of like objects, and more particularly to improvements in a method of applying colored relief decorations to products consisting of china, earthenware, stoneware or a like material. Still more particularly, the invention relates to improvements in a method of applying decorations to ceramic or like objects according to which the colored part of the decoration is furnished by decalcomania (hereinafter called decal) and the decoration or ornamentation further includes a portion with raised and recessed sections (hereinafter called relief image) which are simultaneously applied to the object.

It is already known to provide the surface of a ceramic or like object (hereinafter referred to as object) with a relief image consisting of a substance which can be permanently bonded to the surface of the object by sintering or another suitable treatment involving the application of heat. It is also known to apply to the relief image a decal and to permanently connect the color field or fields of the decal to the object by baking or the like. As a rule, the color image which is furnished by the decal must coincide with the relief image. Therefore, it is necessary to apply the color image simultaneously with the relief image, especially if the combined image varies from object to object. Separate or subsequent application of color images to relief images on a ceramic or like object is possible or warranted only if the relief image exhibits large portions or sections of identical or substantially identical thickness, i.e., when the relief image is relatively simple. Such relief images are formed by the application of deformable ceramic or like mass to the surface of an object with resort to a technique known as "pate-sur-pate" or when the relief image is formed in the mold proper, i.e., while making the object.

In accordance with one of heretofore known techniques of applying a color image (decal) simultaneously with a relief image, the mass which is to form the relief image is mixed with coloring matter so that the entire mass acquires a tint or shade which normally deviates from the color of the object. For example, in the production of the so-called old "Mettlacher Steinzug" (which, translated from German, denotes stoneware or vitrified clay originating in the German city of Mettlach), a plastic mass of stoneware which already contains a selected pigment is processed in a flat mold or form made of gypsum to form a relief image or layer. Such layer is then applied to the object (e.g., a beer mug) to be decorated by resorting to a suitable bonding agent such as slip or an analogous substance. German Auslegeschrift No. 23 26 191 discloses a method of making relief images in the form of decals. The method of this publication also involves the admixture of pigment to the plastic mass, i.e., prior to the making of a decal which constitutes a relief image. A drawback of the just discussed technique is that the relief image which contains pigment conveys a certain impression which is not suitable for all or for many types of decorations. Thus, the decorative effect of a relief image with certain pigment admixed thereto is readily recognizable and rather uniform or perhaps even somewhat monotonous since the entire relief image exhibits a single shade or tint. Moreover, the intensity of coloration is not very satisfactory because the color of the pigment is subdued or diluted as a result of admixture of such pigment to the plastic material of the relief image. It is practically impossible to impart to the relief image several shades of one and the same color, and even much less to apply fields of different colors or shades of two or more colors. On the other hand, the appearance of a ceramic or like object which exhibits a relief image can be greatly enhanced by the application of two or more colors in one or more shades and, when appropriate, by selection of vivid (undiluted) colors.

The transfer images which constitute relief images in accordance with the teaching of German Auslegeschrift No. 23 26 191 can be obtained by resorting to the same technique as in connection with the making of color decals, i.e., to a screen printing process and in several stages. Thus, if one would desire to apply different colors to a relief image which is produced in accordance with the screen printing process, the coincidence of color fields with selected portions or sections of the relief image would not present serious problems. However, it is not possible to apply a color decal to an entire relief image, i.e., the coloring matter can be applied to certain relatively large portions of the relief image but not to any fine detail. Thus, a combination of a relief image and of a decal by following the disclosure of the aforementioned German publication would lead to highly unsatisfactory decorations whose effect would be far from eye pleasing except perhaps when the relief image is redimentary, i.e., without any fine detail.

German Auslegeschrift No. 1 801 321 discloses a method of applying colors to a relief image. This publication teaches to apply a coat of pulverulent metal to the exposed surface of the relief image. Such application involves the utilization of brushes or or a blower. This process is very expensive and it merely results in the application of a unicolored coating to the relief image.

German Auslegeschrift No. 1 253 134 teaches to produce a deep etching effect by resorting to decals. The decal is a relief image consisting mainly of a layer of enamel white overlying a thin film of coloring matter. The layer of enamel white is more or less translucent, i.e., it allows for detection of the film of coloring material therebelow but not with any reasonable degree of clarity. Furthermore, the film of coloring matter is intended to constitute a base color rather than a color image.

OBJECTS AND SUMMARY OF THE INVENTION

An object of the invention is to provide a novel and improved method of simultaneously decorating a ceramic or like object with a relief image as well as with a color image which latter can exhibit one, two or more colors.

Another object of the invention is to provide a method which ensures accurate registry of the two images irrespective of the complexity or lack of complexity of the relief image and regardless of the number of colors which constitute the color image.

A further object of the invention is to provide a method which is simpler than heretofore known methods but is capable of producing an eye-pleasing effect which is far superior to those which are achievable with heretofore known methods.

An additional object of the invention is to provide a method which renders it possible to employ simple decals as color images and which renders it possible to employ relief images that can be obtained in accordance with mass producing techniques.

Still another object of the invention is to provide a novel and improved method of applying a color image which consists of any desired number of color fields in exact register with a relief image in such a way that the application of the two images is completed simultaneously.

A further object of the invention is to provide a method which can be resorted to for application of combined color and relief images to flat or otherwise shaped surfaces and which can be resorted to for application of relatively simple or relatively complex (or even highly complex) combined images to china, stoneware, earthenware or any similar material.

An additional object of the invention is to provide a method which can be practiced by resorting to available apparatus.

The invention resides in the provision of a method of providing the surface of a ceramic or like object with a composite image including (a) a relief image having a flat side and an uneven side and consisting of a plastic material which is combinable with the material of the object by baking, and (b) a decal wherein a layer or mask of lacquer is disposed between a sheet-like carrier and at least one color field and the color field is located between the mask and the flat side of the relief image (i.e., the uneven side of the relief image faces away from the color field or fields). The method comprises the steps of separating the carrier from the mask so that such mask becomes exposed, applying the uneven side of the relief image to the surface of the object, and thereupon reversing the relief image by the application of heat so that at least the major part of its previously uneven side contacts the surface of the object and the originally flat side becomes uneven and is coated by the color field or fields.

The mask is preferably elastic and it preferably contains at least some frit. The reversing steps includes sintering the material of the relief image with attendant conversion of frit into a glaze which coats the color field or fields.

The decal may comprise a film of water-soluble material between the carrier and the mask and the separating step then includes melting the film to thus facilitate or effect separation of the mask from the carrier. The carrier may constitute a sheet of paper.

The method preferably further comprises the step of applying mechanical pressure to the flat side of the relief image prior to the sintering step so that the flat side is partially converted into an uneven side prior to the application of heat. Still further, the method may comprise the step of coating the surface of the object and/or the uneven surface of the relief image with a solvent prior to the applying step: the solvent is effective to ensure adhesion of the relief image to the surface of the object. Such solvent may constitute a substance which effects at least some melting of the mask, i.e., the solvent can penetrate through the relief image and the color field or fields.

If the decal contains several color fields, the configuration of the relief image may be such that at least a portion of at least one color field adheres directly to the surface of the object not later than upon completion of the converting step. Of course, the same can hold true if the decal contains a single color field; a portion of such color field can adhere directly to the surface of the object if the relief image includes one or more portions of zero thickness.

The material of the relief image may be identical with the material of the object.

The novel features which are considered as characteristic of the invention are set forth in particular in the appended claims. The improved method itself, however, together with additional features and advantages thereof, will be best understood upon perusal of the following detailed description of certain embodiments with reference to the accompanying drawing.

DESCRIPTION OF THE PREFERRED EMBODIMENTS

Figure 1:
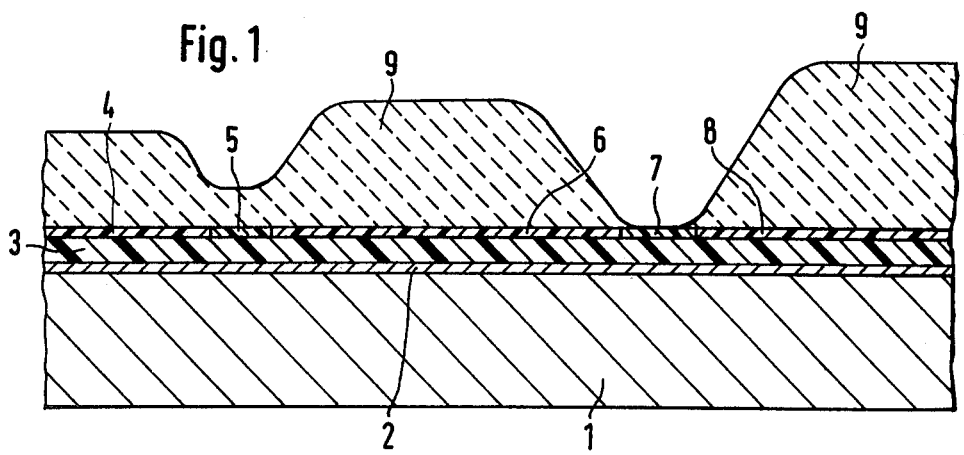
FIG. 1 is a schematic fragmentary sectional view of a combined color and relief image prior to application to a ceramic product.

FIG. 1 illustrates a combined decalcomania and a relief image 9. The decalcomania (hereinafter called decal for short) comprises a flexible carrier 1 which may constitute a paper sheet and one side of which is provided with a film 2 of water-soluble albumen or glue. The film 2 is disposed between the carrier 1 and a layer 3 which constitutes a mask of lacquer and is permeated with glass frit. The exposed side of the layer or mask 3 carries a color image composed of color fields 4, 5, 6, 7 and 8 which are applied thereto in accordance with any suitable technique, preferably in accordance with a screen printing process. The color field 7 is exposed but the other four fields 4, 5, 6 and 9 are overlapped by the relief image 9 which consists of a material similar to or identical with the material of the object or product 11 to be decorated. That surface of such object 11 which is to receive the combined relief and color image is shown at 10. The relief image 9 is also supplied by resort to a screen printing or analogous technique and has an uneven side 9a facing away from the decal as well as a flat side 9b adjacent to the color fields 4–8. The product 11 may consist of china, earthenware of stoneware which is reinforced by baking.

Figure 2:
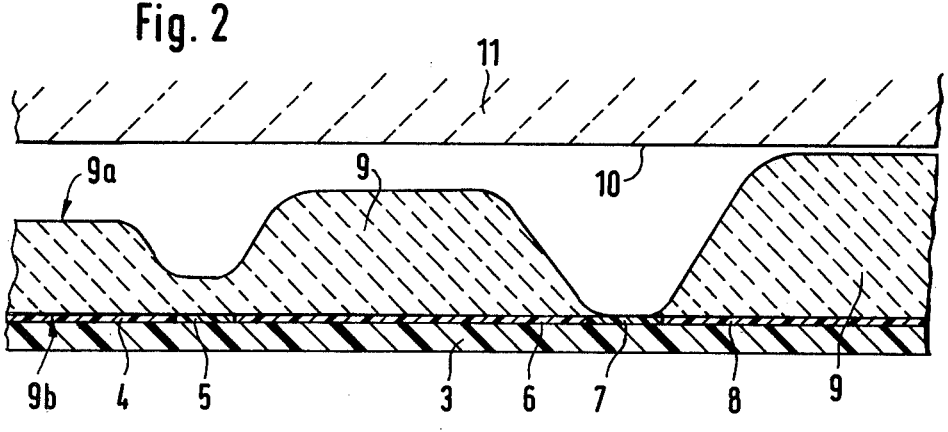
FIG. 2 is a similar fragmentary sectional view of the combined image subsequent to removal of the flexible carrier and preparatory to application to a ceramic product.

In the first step, the decal is wetted so as to dissolve the film 2 with the result that the carrier 1 is removed and the underside (as viewed in FIG. 2) of the mask 3 becomes exposed. In the next step, the uneven side 9a of the relief image 9 is placed against the exposed surface 10 of the object 11 so that the mask 3 and the color fields 4 to 8 remain spaced apart from the surface 10. Prior to placing of the relief image 9 against the surface 10, the latter and/or the side 9a is preferably coated with a suitable solvent mixture, e.g., a solvent known in the trade under the name "Plasticol".

In a further step, the decal is carefully applied by backfilling or doctoring (i.e., by the application of at least some pressure) so as to avoid the development of blisters. This entails only partial reversal of the relief image, i.e., the relatively thick median portions or sections of the relief image become visible by deformation of the mask 3 and color fields 4 to 8. In other words, the originally flat side 9b exhibits at least some unevennesses. However, the finer details of the relief image 9 still remain concealed by the layer 3. What becomes visible is the broad outline of the relief image as well as those (relatively soft) portions which constitute some of the transitions from thicker to thinner portions of the relief image 9. The recesses or grooves between neighboring raised portions of the relief remain distant from the surface 10, i.e., there develop several cavities or spaces between the surface 10 and the layer or film which is formed by the color fields 4 to 8. Some such cavities or recesses are partially filled with the aforementioned solvent which penetrates through the relief image 9 as well as through the layer of color fields 4 to 8 and softens the adjacent stratum of the mask 3. This leads to at least some adherence of the combined decal and relief image to the surface 10 of the object 11.

Figure 3:
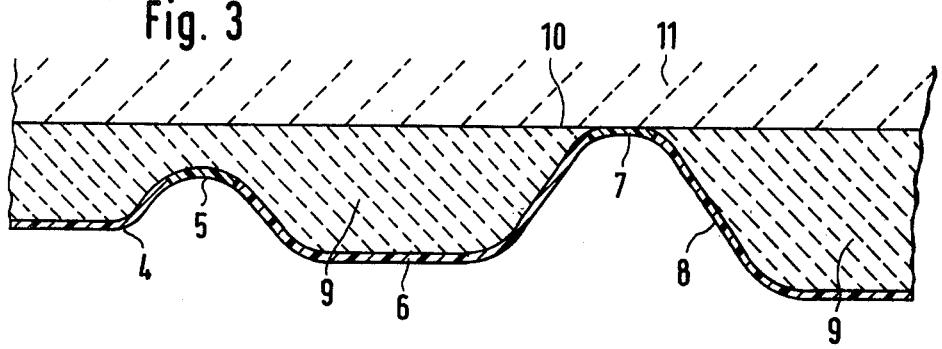
FIG. 3 is a fragmentary sectional view of the finished ceramic product.

The object 11 is thereupon baked whereby the nonvolatile ingredients of the solvent mixture as well as the mask 3 undergo rapid solidification. The remaining cavities disappear in the course of the sintering operation and this entails an inversion of the relief image so that the latter now becomes a positive or true image and its exterior is coated with the color fields 4 to 8 as well as a glaze which is obtained as a result of baking of the mask 3. The color field 7 adheres directly to the surface 10; the remaining color fields 4, 5, 6 and 8 adhere to the adjacent portions of the reversed relief image which is shown in FIG. 3. Baking entails the establishment of an intimate and highly reliable bond between the now flattened side 9a of the relief image 9 and the material of the object 11. As mentioned above, frit which is contained in the mask 3 is converted into a thin glaze covering the color fields 4 to 8 and the now uneven side 9b.

A feature of the invention resides in that the relief image 9 is reversed upon attachment or application to the surface 10 of the object 11. Thus, whereas the step of attaching the decal and the relief image 9 involves contacting the surface 10 by the uneven side 9b of the relief image, the next stage or stages involve the transfer of unevennesses from that side of the relief image 9 which faces the surface 10 to the side which faces and is overlapped by the color fields 4 to 8. Conversion of the originally flat side 9b into an uneven side (see FIG. 3) entails an appropriate deformation of the film consisting of color fields 4 to 8 as well as of the layer mask 3 and of the glaze which is obtained in response to heating of the two images subsequent to attachment to the surface 10 of the object 11. The making of the original relief image 9 in such a way that the color image (fields 4 to 8 of FIG. 3) is in accurate register with selected or desired portions of the freshly formed (previously flat) uneven side 9b presents no problems so that the ultimate product exhibits color fields in or on desired portions of the ultimate (baked or sintered) relief image. Otherwise stated, the color fields 4 to 8 do not immediately cover that side of the original relief image which exhibits raised and recessed portions but rather a more or less flat side which can be readily attached to the entire film consisting of fields 4 to 8. However, further treatment of the combined image then involves gradual or immediate transfer of unevennesses from the side 9a to the side 9b whereby the color fields 4 to 8 automatically cover and enhance the appearance of selected portions of the ultimate relief image.

Another important feature of the improved method is that it employs a decal wherein the mask 3 does not overlie the film of color fields 4 to 8 but is disposed between the color fields and the carrier 1. However, this does not increase the initial cost of the color image since the material of the carrier 1, of the mask 3, of the film 2 (e.g., albumen or a suitable adhesive) and of the color fields 4 to 8 may be the same as in conventional decals wherein the color fields are disposed between the mask and the carrier. The mask 3 can be readily conditioned in such a way that it properly adheres to the film 2 prior to detachment of the carrier 1 and that it is converted into a satisfactory coat of glaze or the like upon completion of the baking step. Furthermore, the mask 3 can properly adhere to the color fields 4 to 8 during application of raw relief image 9 to the decal in a manner as shown in FIG. 1 as well during application of raised portions of the uneven side 9a to the surface 10 of the object 11 (see FIG. 2).

The improved method exhibits numerous important advantages. Thus, it is possible to apply to the relief image any color shade and/or any number of different color fields practically in the same way as on application of decals to smooth surfaces. Furthermore, the color fields accurately overlie selected portions of the (ultimately) uneven side of the relief image so as to achieve the desired decorative effect or effects. The ensuring of accurate registry of color fields with selected portions of the relief image can be achieved in a simple, time-saving and inexpensive way. Still further, the quantity of coloring matter can be held to a minimum, i.e., such quantity is a small fraction of the amounts which are needed for the admixture of one or more pigments to the plastic mass which is to form a relief image in accordance with heretofore known techniques. Also, the steps which must be carried out to apply and bond the combined image to the object are simple, their number is small and they can be carried out by resorting to known apparatus. A departure from heretofore known techniques involves the aforementioned preliminary pressing of the relief image against the surfaces 10, preferably by doctoring or the like, so as to ensure that the originally flat side 9b is converted into a partly uneven side even before the sintering operation begins. Such doctoring step necessitates a certain amount of care and is preferably performed by resorting to specially designed relatively soft tools resembling squeegees, doctor/blades, padded rolls or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of laminating onto a surface of a china, earthenware, stoneware or like ceramic object a composite image which is carried by an elastic lacquer layer on a decalcomania having a sheet-like carrier and a film of soluble material between the carrier and the elastic lacquer layer, said composite image including a relief image which consists of a material adapted to be bonded to the object by sintering and having a flat side, an uneven side and a color image which consists of at least one color field on the relief image, said color image being located between the elastic layer and the flat side of the relief image, said method comprising the steps of separating the elastic layer carrying the color and relief images from the carrier by dissolving the film; applying the uneven side of the relief image to the surface of the object; partially reversing the relief image by the application of pressure against the surface; and thereupon fully reversing the relief image by applying heat to sinter the material of the relief image and cause the previously uneven side of the relief image to become flat and contact the surface of the object and thereby cause the previously flat side of the relief image which is coated with the color field to present the relief image.

2. The method of claim 1 wherein the lacquer layer contains frit and wherein during reversing and sintering the frit is converted into a glaze which coats the color field.

3. The method of claim 1 wherein the film is water soluble.

4. The method of claim 1, further comprising the step of coating the surface of the object with a solvent prior to said applying step, such solvent being effective to bring about adhesion of the relief image to the surface of the object.

5. The method of claim 4, wherein said solvent is a substance which effects at least some melting of the layer.

6. The method of claim 1, wherein the decal comania contains several color fields.

7. The method of claim 6, wherein the configuration of the relief image is such that at least one of the color fields adheres directly to the surface of the object not later than upon completion of the reversing step.

8. The method of claim 1, wherein the relief image consists of a ceramic or like material.

9. The method of claim 1, wherein the carrier is a sheet of paper.

* * * * *